United States Patent
Kahr

(10) Patent No.: US 6,169,472 B1
(45) Date of Patent: Jan. 2, 2001

(54) THERMISTOR SYSTEM

(75) Inventor: Werner Kahr, Deutschlandsberg (AT)

(73) Assignee: Siemens Matsushita Components GmbH & Co. KG, Munich (DE)

( * ) Notice: Under 35 U.S.C. 154(b), the term of this patent shall be extended for 0 days.

(21) Appl. No.: 09/341,781
(22) PCT Filed: Jan. 7, 1998
(86) PCT No.: PCT/DE98/00024
   § 371 Date: Jul. 16, 1999
   § 102(e) Date: Jul. 16, 1999
(87) PCT Pub. No.: WO98/32150
   PCT Pub. Date: Jul. 23, 1998

(30) Foreign Application Priority Data

Jan. 17, 1997  (DE) .............................. 197 01 475

(51) Int. Cl.$^7$ .................................. H01C 7/10
(52) U.S. Cl. .................. 338/22 R; 338/22 SD; 338/237; 338/236; 338/235
(58) Field of Search ................ 338/235, 236, 338/237, 22 R, 22 SD, 220, 221

(56) References Cited

U.S. PATENT DOCUMENTS

| | | |
|---|---|---|
| 3,750,082 * | 7/1973 | Petersen et al. ............ 338/220 |
| 3,958,208 * | 5/1976 | Blaha ......................... 338/22 R |
| 4,024,427 | 5/1977 | Belhomme . |
| 4,357,590 | 11/1982 | Belhomme . |
| 4,635,026 * | 1/1987 | Takeuchi .................... 338/22 SD |
| 4,939,498 | 7/1990 | Yamada et al. . |
| 5,142,265 * | 8/1992 | Motoyoshi et al. ......... 338/22 R |
| 5,153,555 * | 10/1992 | Enomoto et al. ............ 338/22 R |
| 5,714,924 * | 2/1998 | Takeuchi et al. ............ 338/22 R |
| 5,760,676 * | 6/1998 | Yamada ...................... 338/22 R |

FOREIGN PATENT DOCUMENTS

| | | |
|---|---|---|
| 21 07 365 | 8/1972 | (DE) . |
| 27 05 438 | 11/1977 | (DE) . |
| 32 13 558 | 10/1982 | (DE) . |
| 02 305 289 | 12/1990 | (JP) . |
| 5-82305 * | 4/1993 | (JP) ........................... 338/22 R |
| 05 258 905 | 10/1993 | (JP) . |

OTHER PUBLICATIONS

Siemens 1996 Data Book "Kaltleiter" pp. 37–38.

* cited by examiner

*Primary Examiner*—Karl D. Easthom
(74) *Attorney, Agent, or Firm*—Schiff Hardin & Waite

(57) ABSTRACT

A PCT thermistor arrangement for use in a circuit for demagnetizing shadowmasks of color picture tubes, has at least two PTC thermistor elements which are designed as switching PTC thermistors, are or can be thermally coupled and are or can be electrically connected in parallel.

5 Claims, 1 Drawing Sheet

THERMISTOR SYSTEM

BACKGROUND OF THE INVENTION

1. Field of the Invention

The present invention relates to a PTC thermistor arrangement for use in a circuit for demagnetizing shadowmasks of colour picture tubes, having at least two PTC thermistors which are electrically connectable in parallel, that are thermally coupled and that are installed in a housing.

2. Description of the Prior Art

A PTC thermistor arrangement is disclosed in U.S Pat. No. 4,024,427, wherein the PTC thermistors are connected in series therein.

Japanese Application, JP-A 05 258905 discloses that the contact elements for a thermally coupled PTC thermistor arrangement be planarly supported at the housing wall.

PTC thermistor arrangements for the aforementioned purpose are disclosed in the applicant's 1996 Data Book "Kaltleiter", pages 37 and 38. At least one PTC thermistor of this type is used in this context to reduce the current in a demagnetizing coil from an initial current value to a residual current value. According to one embodiment, a demagnetization circuit for the abovementioned purpose is formed by the series circuit of a PTC thermistor and a demagnetizing coil which is connected to an AC voltage source.

According to a further embodiment, a circuit arrangement of this type may also contain two thermally coupled PTC thermistors. The first is the switching PTC thermistor connected in series with the demagnetizing coil. The second is a heating PTC thermistor or power supply PTC thermistor which is thermally coupled to the switching PTC thermistor, and is connected in parallel with this series circuit. This circuit is also connected to an AC supply voltage. With this circuit, the residual current through the demagnetizing coil can be further reduced, compared with the abovementioned circuit, with just one switching PTC thermistor, because the switching PTC thermistor, in addition to its own heating, is externally heated by the power supply or heating PTC thermistor.

Depending on the picture tube properties, there is a need in some situations for low-impedance switches and/or those with a so-called "long decay" behaviour at high initial currents. Large-volume PTC thermistor wafers are provided in known solutions to address these requirements, via an electrical connection in parallel with two embodiment using a single PTC thermistor, or with two PTC thermistors of the embodiments explained used for extremely low-impedance concepts.

On the one hand, the parallel circuit enables the resistance to be halved for the purpose of the requisite property of low impedance, while, on the other hand, a turn-off delay is provided by the division of the initial current between two switches for the purpose of the requisite "long decay" behaviour.

Here, however wiring-up two housing designs to the demagnetizing coil, is expensive.

SUMMARY OF THE INVENTION

The present invention is based on the object of providing a simple and thus less expensive solution to the aforementioned problem.

This object is achieved according to the invention by means of a PTC thermistor arrangement that comprises a unit having two or more PTC thermistors connectable in parallel and thermally coupled. The unit is held into a housing by attachments on top, a recess on the bottom, and by spring contact elements within above line 27, insert a centered heading.

DESCRIPTION OF THE DRAWINGS

The invention is explained in more detail below using exemplary embodiments in accordance with the figures of the following drawings.

DESCRIPTION OF THE PREFERRED EMBODIMENT

Figure 1:
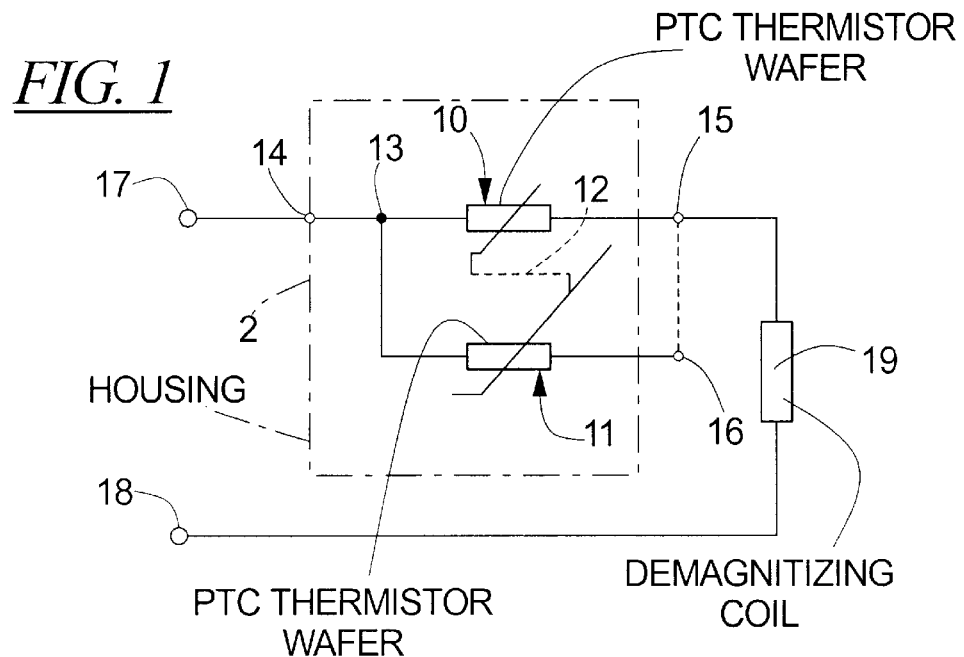
FIG. 1 is a schematic circuit diagram of a demagnetization circuit arrangement with a PTC thermistor arrangement designed according to the invention.

According to FIG. 1, in a PTC thermistor arrangement, provision is made of two thermally coupled PTC thermistor wafers 10 and 11, which serve as switches, are electrically connected in parallel or can be connected in parallel and are arranged in a circuit 17, 18 of an AC voltage source, which is not illustrated in the drawing, in series with a demagnetizing coil 19 of a television set. The thermal coupling of the PTC thermistor wafers 10 and 11 is indicated schematically by a dashed connection 12 in FIG. 1. The thermally coupled PTC thermistor wafers 10 and 11 are arranged in a housing 2 which is indicated schematically by dot-dashed lines.

To allow a parallel connection one electrical terminal of the PTC thermistor wafers 10 and 11 is electrically connected to one another at a circuit node 13. The respective other electrical terminals of each of, the PTC thermistor wafers 10 and 11 are routed to a circuit node 15 and 16, respectively. These circuit nodes 15 and 16 may be routed out of the housing 2, thereby enabling a user, depending on the application, to realize the parallel circuit of the PTC thermistor wafers 10 and 11 by way of an electrical connection of the circuit nodes 15 and 16, indicated by a dashed line.

However, it is also possible for the terminals of the PTC thermistor wafers 10 and 11 leading to the circuit nodes 15 and 16 to be permanently electrically connected to one another inside the housing, with the result that the electrical connection in parallel of the two PTC thermistor wafers 10 and 11 is present inside the housing design in a manner predetermined by the manufacturer.

Figure 2:
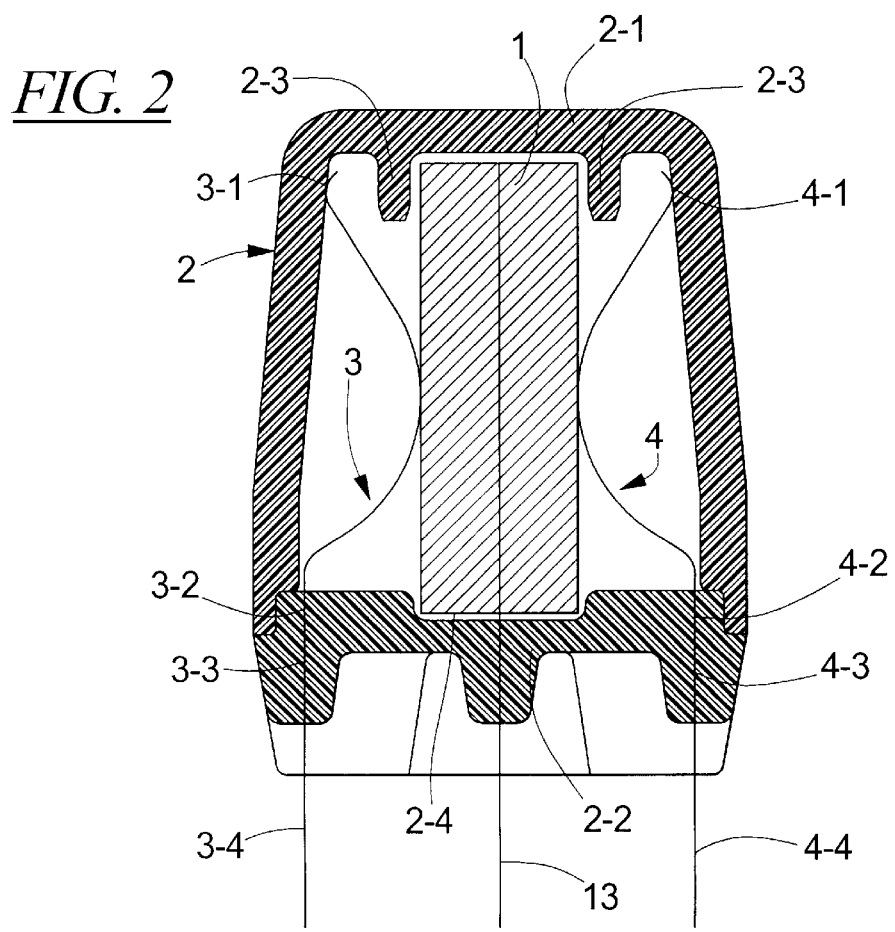
FIG. 2 is an illustrative vertical cross-section view showing an advantageous option for fitting a PTC thermistor arrangement according to the invention into a housing.

One possible advantageous embodiment of the fitting of a PTC thermistor arrangement according to FIG. 1 into a housing is illustrated in FIG. 2. In this figure, the PTC thermistor arrangement formed by the PTC thermistor wafers 10 and 11 according to FIG. 1 is illustrated schematically by a unit 1. In general terms, the entire arrangement is formed by the unit 1, the housing 2 and spring contact elements 3 and 4. For the following explanations, a housing top side is designated separately by 2-1 and a housing base by 2-2. The unit 1 is held in its position at the housing top side 2-1 by way of attachments 2-3 and at the housing base 2-2 by way of a recess 2-4.

The spring contact elements 3, 4 are each supported at two supporting points 3-1, 3-2 and 4-1, 4-2, 5 respectively, in the housing, the supporting points engaging on mutually remote sides of a respective contact point on the unit 1.

The spring contact elements 3, 4 are preferably spring metal-sheet elements which are designed such that 10 they are preferably concave as seen in a direction from the supporting points 3-1, 3-2 and 4-1, 4-2, respectively, on the housing 2 towards the contact point 3-5 and 4-5, respectively, on the component body 1. The supporting points 3-1, 3-2 and 4-1, 4-2 are situated, as illustrated, in the region of the housing top side 2-1 and housing base 2-2.

In the region of the housing base 2-2, the supporting points 3-1, 3-2 and, respectively, 4-1, 4-2 of the spring contact elements 3, 4 are preferably formed by an extension of the concave part of the spring contact elements being pierced through the housing base 2-2. The piercing-through regions are in this case designated by 3-3 and 4-3, respectively.

This design of the spring contact elements 3, 4 realizes, on the one hand, a high permanent clamping action which is of crucial importance for the service life performance of the PTC thermistor arrangement. Since, furthermore, the spring contact elements 3, 4 are pierced through the housing base 2-2 by means of their extensions 3-4 and 4-4, respectively, the resulting housing opening remains restricted to the spring cross section. This results in a minimization of the housing opening with the significant advantage that external contaminants can largely be kept away from the housing interior, which in turn leads to an increase in the operational reliability.

The extensions 3-4 and 4-4 in this case correspond to the circuit nodes 15 and 16, while the circuit node 13 is directly discernible from FIG. 2.

What is claimed is:

1. A PTC thermistor apparatus for use in a circuit for demagnetizing shadowmasks of color picture tubes, comprising:
    a housing wherein said housing has side walls arranged vertically between a top wall and a base, wherein said top wall has attachments which protrude from a bottom surface of said top side, said protruding attachments each having an inner vertical surface essentially parallel to said housing side walls, and wherein said base has a recess located on a top surface of said base, said recess having two vertical surfaces essentially parallel to said housing side walls;
    a unit which contains at least two PTC thermistors that are dimensioned to be electrically identical and are electrically connected in parallel, that are thermally coupled, and that are installed in said housing, said unit having;
        a top end held in place by said housing attachments, wherein opposite sides of said unit facing away from one another lay flat against said vertical surfaces of said protruding attachments for support;
        two contact points located on said opposite sides of said unit facing away from one another, and
        a bottom end held in place by said housing recess wherein said opposite sides of said unit facing away from one another lay flat against said two vertical surfaces of said recess, and
    each PTC thermistor comprises a first electrical terminal and a second electrical terminal wherein each of said PTC thermistors has their said first electrical terminals interconnected inside of said housing, each PTC thermistor further comprises:
    spring contact elements partially located within said housing which are fashioned as spring sheet elements, which are concave as seen in a direction from said upper support points and said lower support points towards said unit contact points, each said spring contact element having:
        an upper support point located at a top end which supports said spring contact element against one of said housing side walls,
        a unit contact region located adjacent to said top end which electrically contacts and holds said unit at said unit contact point,
        a lower support point located adjacent to said unit contact region near said housing base,
        a piercing through region located adjacent to said lower support point which pierces through said housing base, and
        an extension located at a bottom end of said spring contact element which protrudes outside of said housing base.

2. A PTC thermistor apparatus according to claim 1, wherein said PTC thermistors have the same function of limiting a current in a demagnetizing coil.

3. A PTC thermistor apparatus according to claim 1 wherein each of said PTC thermistors has their second electrical terminals routed separately out of said housing wherein said second terminals can be externally interconnected for the purpose of electrically connecting the PTC thermistor elements in parallel.

4. A PTC thermistor apparatus according to claim 1, wherein said PTC thermistor elements are electrically connected in parallel internally within said housing.

5. A PTC thermistor apparatus according to claim 1, wherein said PTC thermistors are dimensioned identically in mechanical terms.

* * * * *